(12) United States Patent
Jägle et al.

(10) Patent No.: US 10,260,396 B2
(45) Date of Patent: Apr. 16, 2019

(54) EXHAUST SYSTEM FOR A MOTOR VEHICLE AND CORRESPONDING MOTOR VEHICLE

(71) Applicant: AUDI AG, Ingolstadt (DE)

(72) Inventors: Karl Jägle, Ingolstadt (DE); Thomas Hoffmann, Riedenburg (DE); Markus Störmer, Berching (DE); Alexander Berringer, Kösching (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/923,371

(22) Filed: Mar. 16, 2018

(65) Prior Publication Data

US 2018/0334942 A1 Nov. 22, 2018

(30) Foreign Application Priority Data

May 22, 2017 (DE) .................. 10 2017 208 637

(51) Int. Cl.
*F01N 5/02* (2006.01)
*F28D 20/02* (2006.01)
(Continued)

(52) U.S. Cl.
CPC ........... *F01N 5/02* (2013.01); *B60H 1/00278* (2013.01); *B60K 13/04* (2013.01); *F01N 13/001* (2013.01);
(Continued)

(58) Field of Classification Search
CPC ............. F01N 2240/02; F01N 2240/10; F01N 2410/00; F01N 2410/02; F28F 27/02; F28D 2020/0004
(Continued)

(56) References Cited

U.S. PATENT DOCUMENTS

| 2009/0038302 A1* | 2/2009 | Yamada | F01N 3/0205 60/320 |
| 2013/0199751 A1* | 8/2013 | Levin | F02G 5/02 165/10 |
| 2015/0152762 A1* | 6/2015 | Geminn et al. | F01N 5/02 165/51 |

FOREIGN PATENT DOCUMENTS

| DE | 10 2005 004674 A1 | 8/2006 |
| DE | 102012211466 A1 | 1/2014 |

(Continued)

OTHER PUBLICATIONS

German search report dated Jan. 8, 2018 of corresponding application No. DE102017208637.8; 8 pgs.
(Continued)

*Primary Examiner* — Allen J Flanigan
(74) *Attorney, Agent, or Firm* — Maier & Maier, PLLC

(57) ABSTRACT

An exhaust system for a motor vehicle, with an exhaust pipe for discharging exhaust of a device that produces an exhaust. A heat accumulator, which surrounds the exhaust pipe in the peripheral direction with respect to a longitudinal central axis of the exhaust pipe, is present, at least in regions thereof, and, in the radial direction between the exhaust pipe and the heat accumulator over at least a portion of the longitudinal extension the heat accumulator, a cross-section adjusting element for adjusting a passage cross section is arranged between the exhaust pipe and the heat accumulator. The cross-section adjusting element has a first holed pipe, which surrounds the exhaust pipe, and a second holed pipe, which surrounds the first holed pipe. The first holed pipe and the second holed pipe can be shifted in position relative to each other for adjusting the passage cross section.

10 Claims, 2 Drawing Sheets

Figure 1:
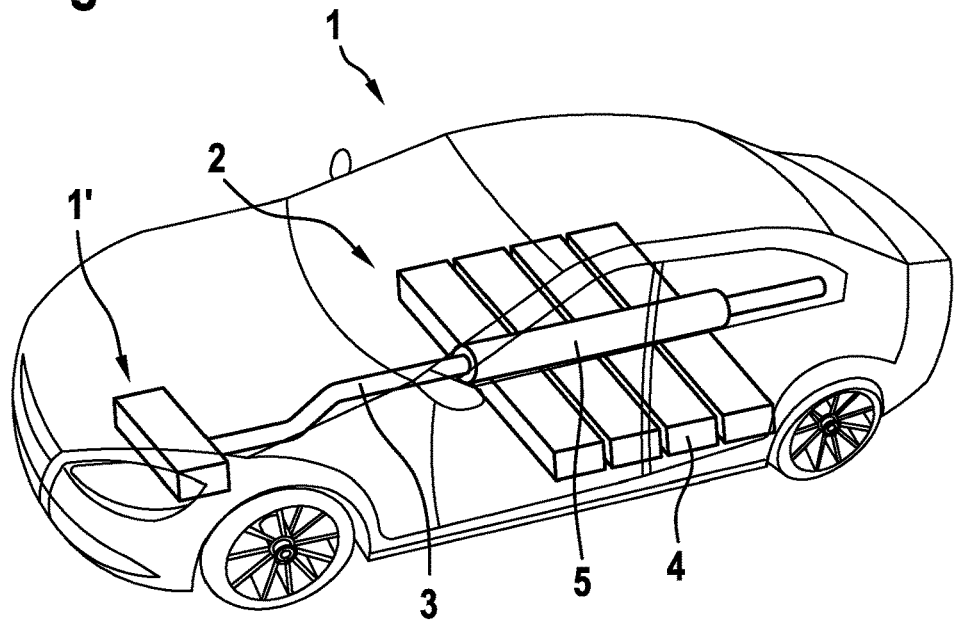

(51) Int. Cl.
  B60K 13/04    (2006.01)
  B60H 1/00     (2006.01)
  F01N 13/00    (2010.01)
  F01N 13/08    (2010.01)
  F01N 13/18    (2010.01)
  F28F 27/02    (2006.01)
  F28D 21/00    (2006.01)
  F28D 20/00    (2006.01)
  B60H 1/20     (2006.01)
  F28F 13/00    (2006.01)
  F01N 3/10     (2006.01)

(52) U.S. Cl.
  CPC .......... *F01N 13/08* (2013.01); *F01N 13/1811* (2013.01); *F01N 13/1838* (2013.01); *F01N 13/1872* (2013.01); *F28D 20/021* (2013.01); *F28D 20/028* (2013.01); *F28D 21/0003* (2013.01); *F28F 27/02* (2013.01); *B60H 1/20* (2013.01); *F01N 3/10* (2013.01); *F01N 2240/02* (2013.01); *F01N 2240/10* (2013.01); *F01N 2240/36* (2013.01); *F01N 2260/08* (2013.01); *F01N 2340/04* (2013.01); *F01N 2410/03* (2013.01); *F01N 2410/04* (2013.01); *F01N 2410/06* (2013.01); *F01N 2470/06* (2013.01); *F01N 2470/24* (2013.01); *F01N 2590/11* (2013.01); *F28D 2020/0013* (2013.01); *F28F 2013/008* (2013.01)

(58) Field of Classification Search
  USPC .................................. 165/10, 96, 102, 103
  See application file for complete search history.

(56) References Cited

FOREIGN PATENT DOCUMENTS

| DE | 102013016795 A1 | 7/2014 | |
|----|-----------------|--------|---|
| DE | 102014103114 A1 | 9/2014 | |
| DE | 102013215507 A1 | 2/2015 | |
| DE | 102014205878 A1 | 10/2015 | |
| DE | 102016216281 A1 * | 3/2018 | ............... F01N 5/02 |

OTHER PUBLICATIONS

European Search Report dated Jun. 20, 2018, in connection with corresponding European Application No. 18158591.0; 6 pgs.

* cited by examiner

EXHAUST SYSTEM FOR A MOTOR VEHICLE AND CORRESPONDING MOTOR VEHICLE

FIELD

The invention relates to an exhaust system for a motor vehicle, with an exhaust pipe for discharging exhaust of a device that produces exhaust. The invention further relates to a motor vehicle.

BACKGROUND

The exhaust system serves for the discharge of the exhaust of at least one device that produces exhaust, in particular of a motor vehicle drive assembly that produces exhaust, in the direction of its outer surroundings. For this purpose, the exhaust system is equipped with the exhaust pipe, which, on the one hand, is connected to the drive assembly that produces exhaust and, on the other hand, opens into the outer surroundings of the motor vehicle or is connected to another exhaust pipe that opens into the outer surroundings. The exhaust that is discharged by means of the exhaust system contains thermal energy, which, for the most part or even completely, is discharged together with the exhaust into the outer surroundings. Accordingly, the quantity of heat is lost for any other utilization inside of the motor vehicle.

Known from the prior art is, for example, the publication DE 10 2013 215 507 A1. This publication relates to a vehicle with a hybrid drive, the traction battery of which is arranged at the back end at the underside of a vehicle floor panel, which has a central tunnel that is open downward for an exhaust system of an internal combustion engine. In this case, formed in the battery housing of the traction battery is a longitudinal track that is open downward and extends the central tunnel toward the tail end of the vehicle and through which the exhaust system extends toward the rear in its further course.

Further known from the prior art is the publication DE 10 2013 215 507 A1. This publication relates to a vehicle with a hybrid drive, the traction battery of which is arranged at the front end at the underside of a portion of the vehicle floor panel, which has a central tunnel that is open downward for an exhaust system of an internal combustion engine. In this case, formed in the battery housing of the traction battery is a longitudinal axis that is open downward and extends the central tunnel toward the tail end of the vehicle and through which the exhaust system extends toward the rear in its further course.

Finally, the publication DE 10 2014 2015 878 A1 relates to an internal combustion engine with at least one exhaust turbocharger and an exhaust treatment system, wherein at least one exhaust treatment element is arranged upstream of a turbine of the exhaust turbocharger. In this case, a power supply device is provided, which is equipped for supplying additional power for the exhaust turbocharger in at least one operating state of the internal combustion engine.

SUMMARY

The object of the invention is to propose an exhaust system for a motor vehicle, which, in comparison to known exhaust systems, has advantages and, in particular, makes possible a flexible utilization of the heat contained in the exhaust.

This is achieved in accordance with the invention by means of an exhaust system for a motor vehicle. It is provided here that there is a heat accumulator that surrounds the exhaust pipe, at least in portions thereof, in the peripheral direction with respect to the longitudinal central axis of the exhaust pipe and, in the radial direction between the exhaust pipe and the heat accumulator over at least a portion of the longitudinal extension of the heat accumulator, a cross-section adjusting element for adjusting a passage cross section between the exhaust pipe and the heat accumulator is arranged, wherein the cross-section adjusting element has a first holed pipe, which surrounds the exhaust pipe, and a second holed pipe, which surrounds the first holed pipe, wherein the first holed pipe and the second holed pipe can be shifted in position relative to each other for adjusting the passage cross section.

The exhaust system is equipped with the heat accumulator, by means of which the heat contained in the exhaust can undergo intervening storage and subsequently be made available for different intended uses. The heat accumulator encompasses the exhaust pipe in the peripheral direction with respect to the longitudinal central axis of the exhaust pipe at least partially, but preferably completely. In this case, the heat accumulator extends in the axial direction along the exhaust pipe over at least a portion of the longitudinal extension of the exhaust pipe.

By use of the cross-section adjusting element, it is possible to adjust the passage cross section between the exhaust pipe and the heat accumulator and accordingly also to adjust the heat transfer from the exhaust pipe to the heat accumulator and/or from the heat accumulator to the exhaust pipe. Preferably, the exhaust pipe is designed to be fluid-tight in the region of the heat accumulator and/or in the region of the cross-section adjusting element and, in particular, to be completely fluid-tight, so that, by use of the cross-section adjusting element, the passage cross section can be created between the uninterrupted outer circumference of the exhaust pipe and an inner circumference of the heat accumulator, wherein, for a freed passage cross section, that is, a passage cross section greater than zero, heat is exchanged between the exhaust pipe and the heat accumulator primarily via thermal radiation and/or convection. The amount of the thermal radiation and/or the convection, that is, the heat transfer, can be adjusted by means of the cross-section adjusting element. Preferably, the heat is transferred for the most part, and, in particular, exclusively or at least nearly exclusively via thermal radiation.

Alternatively, however, it can also be provided that that the exhaust pipe has at least one exhaust passage opening in the area of the heat accumulator and/or of the cross-section adjusting element, so that, when the cross-section adjusting element is appropriately adjusted, that is, when the passage cross section is greater than zero, exhaust can be discharged from the exhaust pipe and can flow in the direction of the inner circumference of the heat accumulator or all the way to it. Subsequently, the exhaust can reenter the exhaust pipe through the exhaust passage opening or through another exhaust passage opening. By means of an embodiment of this kind, the heat transfer between the exhaust and the heat accumulator can be improved. However, additional measures need to be taken in order to prevent a leakage of exhaust out of the exhaust system.

The cross-section adjusting element is equipped with the first holed pipe and the second holed pipe. The first holed pipe encompasses the exhaust pipe in the peripheral direction preferably completely, whereas the second holed pipe encompasses the first holed pipe in the peripheral direction preferably completely. A holed pipe is understood to mean a pipe that has at least one passage opening, that is, an opening that passes completely through a wall of the holed pipe in the radial direction. In this case, the passage opening may have any cross-sectional shape. A hole in the sense of the holed pipe is understood in this regard to mean a through-flow opening with any cross-sectional shape. For example, a round, oval, rectangular, or slit-like or slot-like cross-sectional shape is provided.

Both the first holed pipe and the second holed pipe are equipped with at least one passage opening of this kind, but preferably each is equipped with a plurality of passage openings of this kind. Preferably, in this case, one passage opening of the second holed pipe is associated with a passage opening of the first holed pipe, so that, for at least one arrangement of the two holed pipes with respect to each other, the two passage openings are aligned with each other, so that the passage cross section is freed at least partially, in particular completely. For at least one other position of the two holed pipes with respect to each other, in contrast, the two through-flow openings are arranged in such a way that another passage cross section exists, in particular a passage cross section of zero, so that the connection, in particular the optical connection and/or flow connection, between the exhaust pipe and the heat accumulator is interrupted.

The two holed pipes, that is, the first holed pipe and the second holed pipe, can be shifted in position relative to each other for adjusting the passage cross section. The shift in position can fundamentally occur in any way; for example, the two holed pipes can be shifted in position relative to each other in the axial direction with respect to the longitudinal central axis of the exhaust pipe or with respect to a longitudinal central axis of at least one of the two holed pipes. Alternatively or additionally, it is also possible to provide for a shift in position of the two holed pipes relative to each other in the peripheral direction, that is, a rotation of the two holed pipes relative to each other.

More preferably, the first holed pipe is arranged in fixed position, namely with respect to the exhaust pipe. In contrast, the second holed pipe can be shifted in position with respect to the first holed pipe and consequently with respect to the exhaust pipe in order to thereby adjust the passage cross section. The cross-section adjusting element, in particular the first holed pipe and/or the second holed pipe, has, for example, a material with low thermal conductivity, in particular a material that has a lower thermal conductivity than the exhaust pipe.

An embodiment of the exhaust system of this kind is particularly advantageous in the case that an exhaust cleaning device is arranged downstream of the heat accumulator with respect to a main flow direction of the exhaust through the exhaust pipe. The exhaust cleaning device is designed in such a way that, for proper operation, it must have a certain operating temperature, which is higher than the usual ambient temperature of the motor vehicle.

At the start of operation of the motor vehicle or of its drive assembly, the temperature of the exhaust cleaning device is usually lower than its operating temperature. In order to make possible a quick operation of the exhaust cleaning device, it is appropriate to convey to it as much of the heat contained in the exhaust as possible. If, in the heat accumulator, no heat or at least too small a quantity of heat is intermediately stored, then the passage cross section is adjusted by means of the cross-section adjusting element to a value that is as small as possible, in particular to zero, in order to convey the heat contained in the exhaust for the most part to the exhaust cleaning device and not or at most only in small part to the heat accumulator.

If, in contrast, a sufficient quantity of heat has already been intermediately stored in the heat accumulator, then this heat can be utilized in order to heat the exhaust coming from the drive assembly. For this purpose, the cross-section adjusting element is adjusted for freeing the passage cross section between the exhaust pipe and the heat accumulator. If the exhaust cleaning device attains its operating temperature, then it is possible in any case for at least a part of the heat contained in the exhaust to undergo intervening storage in the heat accumulator. For this purpose, the cross-section adjusting element is adjusted for at least partial freeing of the passage cross section.

An enhancement of the invention provides that at least one heat exchanger line is arranged in the heat accumulator. The heat exchanger line serves for charging heat to and/or discharging heat from the heat accumulator. Preferably, it is provided that the heat accumulator is charged with heat contained in the exhaust and this heat is subsequently to be discharged from the heat accumulator with the use of the heat exchanger line or with the use of a fluid present in it.

The heat is conveyed, for example, to a heat consumer, in particular a passenger compartment heater of the motor vehicle, via the heat exchanger line. An embodiment of this kind is provided, in particular, for plug-in hybrid motor vehicles in which the passenger compartment heater is often operated electrically. However, this reduces the range of the motor vehicle. In this regard, for increasing the range, it is appropriate to take at least a part of the heat needed for the passenger compartment heater from the heat accumulator.

An enhancement of the invention provides that a heat storage medium is present in the heat accumulator. The heat storage medium serves for the intervening storage of heat. The heat storage medium is, for example, a fluid present in a housing of the heat accumulator, wherein said fluid can be present in any aggregate state.

Another preferred embodiment of the invention provides that the heat storage medium is a latent heat storage medium. The latent heat storage medium is present in the form of a so-called phase change material. Utilized for intervening storage of the heat is the enthalpy of the thermodynamic change of state of the latent heat storage medium.

Another embodiment of the invention provides that the heat exchanger line passes through the heat storage medium. Preferably, the heat exchanger line here is arranged spaced apart—at least as viewed in cross section—from a wall of the heat storage housing, so that the heat exchanger line—again viewed in cross section—is completely encompassed in the peripheral direction by the heat storage medium. By means of an arrangement of the heat exchanger line of this kind, an especially good heat transfer is realized between the heat storage medium and the heat exchanger line or the fluid that is present in the heat exchanger line.

Another preferred embodiment of the invention provides that the heat accumulator has a hollow circular-cylindrical heat storage housing. This means that the heat accumulator, as viewed in cross section, is annular and, accordingly, completely encompasses the exhaust line in the peripheral direction. As viewed in cross section, the heat accumulator is bordered both on the outside and on the inside, respectively, by a round wall of the heat storage housing. An embodiment of this kind makes possible an especially space-saving arrangement of the heat accumulator.

Another embodiment of the invention provides that a fluid chamber, which is present in the radial direction between the exhaust pipe and the heat accumulator, can be evacuated or is evacuated. As viewed in the radial direction, the fluid chamber can be present between the exhaust pipe and the first holed pipe or between the second holed pipe and the heat accumulator. Through the evacuation of the fluid chamber, it is possible to further reduce convective heat transfer to an especially great extent, in particular further than through an adjustment of the passage cross section by means of the cross-section adjusting element, to zero. Through the evacuation of the fluid chamber, the heat accumulator is thermally decoupled from the exhaust pipe, at least largely or even completely, in regard to convective heat transfer. For evacuation of the fluid chamber, a corresponding device is connected to it, in particular, a device for producing reduced pressure, by means of which the evacuation of the fluid chamber can be carried out.

Alternatively, it can be provided that the fluid chamber is evacuated permanently. In an embodiment of this kind, the heat transfer occurs in substantial part, namely completely or at least nearly completely, through thermal radiation, provided that the passage cross section is freed at least partially and insofar as it is different from zero. If the passage cross section is equal to zero, that is, if the optical connection between the exhaust pipe and the heat accumulator is interrupted, then the heat transfer is interrupted completely or at least nearly completely, because the convective heat transfer from the exhaust pipe to the heat accumulator is largely or even completely suppressed.

The embodiment with a permanently evacuated fluid chamber thus makes possible an especially effective thermal insulation of the exhaust pipe and the heat accumulator relative to each other. The fluid chamber can be permanently fluid-tight. For example, in this case, it is evacuated one time and subsequently closed in a fluid-tight manner. Alternatively, the fluid chamber can obviously be connected to the device for producing reduced pressure and be permanently evacuated by it.

Finally, it is possible in the scope of another embodiment of the invention to provide that the fluid chamber is connected in terms of fluid mechanics to a source of reduced pressure via a control valve. Reference to an embodiment of the kind has already been made. The source of reduced pressure here represents the device for evacuation of the fluid chamber. The source of reduced pressure is connected to the fluid chamber via the control valve. In a first switch position of the control valve, the fluid chamber is separated in terms of fluid mechanics from the source of reduced pressure, whereas, in a second switch position, the flow connection between the fluid chamber and the source of reduced pressure is established. Accordingly, in the second switch position, the fluid chamber is subjected to the reduced pressure supplied by the source of reduced pressure.

Preferably, the fluid chamber is connected via another control valve to the outer surroundings of the exhaust system or to a pressure source. For a first switch position of this other control valve, the fluid chamber is decoupled in terms of fluid mechanics from the outer surroundings or the pressure source, whereas, in a second switch position, it is in flow connection with the outer surroundings or the pressure source. In the second switch position, it is possible for the fluid to flow from the outer surroundings or from the pressure source into the fluid chamber, so that, in the fluid chamber, the ambient pressure or the pressure supplied by the pressure source is adjusted at least to approximation.

The invention further relates to a motor vehicle with an energy storage unit for intervening storage of electric energy and with an exhaust system, in particular an exhaust system in accordance with the preceding embodiments, wherein the exhaust system is equipped with an exhaust pipe for discharging exhaust of a device that produces an exhaust. In this case, it is provided that a heat accumulator, which surrounds the exhaust pipe at least in regions in the peripheral direction with respect to the longitudinal central axis of the exhaust pipe, is present, and a cross-section adjusting element for adjusting a passage cross section between the exhaust pipe [and]* the heat accumulator is arranged in the radial direction between the exhaust pipe and the heat accumulator over at least a portion of the longitudinal extension of the heat accumulator, wherein the cross-section adjusting element has a first holed pipe, which surrounds the exhaust pipe, and a second holed pipe, which surrounds the first holed pipe, wherein the first holed pipe and the second holed pipe can be shifted in position relative to each other for adjusting the passage cross section.

Reference has already been made to the advantages of such an embodiment of the motor vehicle or of the exhaust system. Both the motor vehicle and the exhaust system of the motor vehicle can be further developed in accordance with the preceding embodiments, so that in this regard, reference is made to said embodiments.

Another embodiment of the invention provides that the heat accumulator encompasses a region of the exhaust pipe that overlaps the energy storage unit. The heat accumulator serves in this regard for thermal insulation of the energy storage unit or for thermal decoupling of the energy storage unit from the exhaust pipe. In this way, it is possible for the energy storage unit to be arranged in the immediate vicinity of the exhaust pipe, without any resulting unpermitted thermal exposure of the energy storage unit to the heat of the exhaust that flows through the exhaust pipe.

For example, as viewed in the axial direction, the exhaust pipe overlaps, at least in one region, with the energy storage unit. The heat accumulator is also arranged in this region. More preferably, the heat accumulator extends over this entire region, as viewed in the axial direction with respect to the longitudinal central axis of the exhaust pipe and, in particular, it protrudes over this area at least on one side and more preferably on both sides. It can be provided, for example, that, on its outer side, the heat accumulator rests against the energy storage unit. In this case, it can be provided that the heat accumulator has a thermal insulation at its outer periphery, at least in its region that rests against the energy storage unit.

BRIEF DESCRIPTION

Figure 2:
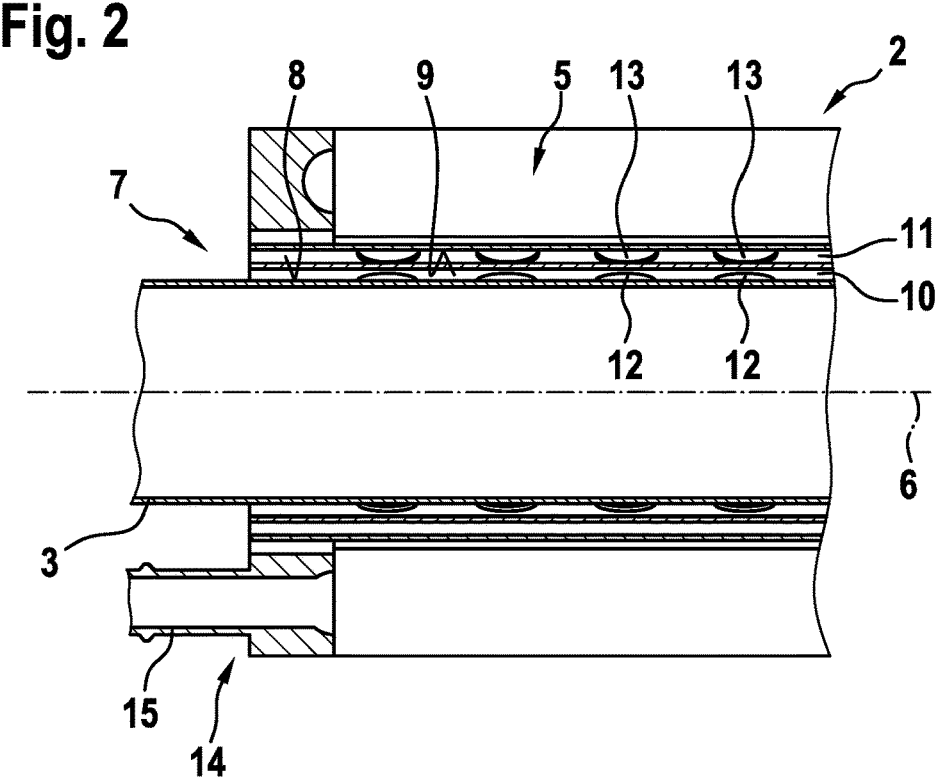
Figure 3:
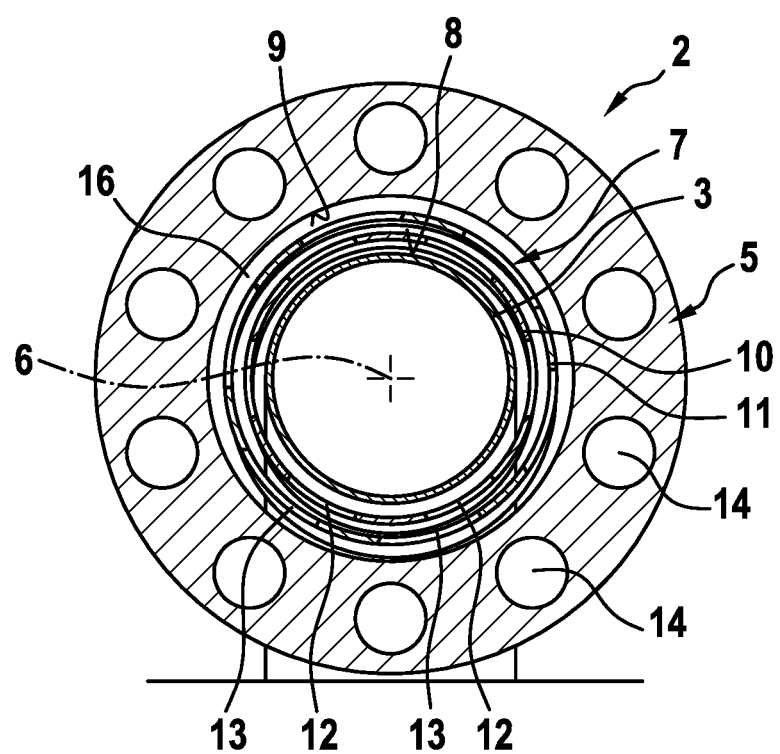

The invention will be explained in detail below on the basis of the exemplary embodiments illustrated in the drawing, without bringing about any limitation of the invention thereby. Shown are:

FIG. 1 a schematic illustration of a motor vehicle with an energy storage unit for the intervening or intermediate storage of electrical energy and with an exhaust system, FIG. 2 a schematic longitudinal sectional illustration through a region of the exhaust system, and FIG. 3 a schematic cross-sectional illustration through a region of the exhaust system.

DETAILED DESCRIPTION

FIG. 1 shows a schematic illustration of a motor vehicle 1, which has an exhaust-producing device 1', in particular a drive assembly, which is not shown here in greater detail, and an exhaust system 2. The exhaust system 2 serves for the discharge of exhaust gases that occur during operation of the device that produces an exhaust 1' or of the drive assembly that produces an exhaust. The exhaust system 2 is equipped with an exhaust pipe 3, which extends in the longitudinal direction of the motor vehicle 1 at least partially through said motor vehicle. Usually, the motor vehicle 1 extends from the drive assembly, which is arranged in the front in the main direction of travel of the motor vehicle 1, to the tail end of the motor vehicle, which lies in the rear with respect to the main direction of travel. At the tail end of the motor vehicle 1, the exhaust is discharged from the exhaust system 2 through a tailpipe.

Furthermore, the motor vehicle 1 is equipped with an energy storage unit 4 for intervening storage of electrical energy. The electrical energy that undergoes intervening storage in the energy storage unit 4 serves, for example, for the operation of another drive assembly, namely an electric motor. Preferably, a drive device of the motor vehicle 1 that compress the drive assembly and the additional drive assembly is constructed here as a hybrid drive device, which has both the exhaust-producing drive assembly and the electric motor.

For thermal insulation of the exhaust pipe 3 and the energy storage unit 4 from each other, a heat accumulator 5 is provided in a region in which the exhaust pipe 3 and the energy storage unit 4 overlap each other in the axial direction with respect to a longitudinal central axis of the exhaust pipe 3, said heat accumulator surrounding, at least partially and preferably completely, the exhaust pipe 3 in the peripheral direction with respect to the longitudinal central axis of the exhaust pipe 3. Preferably, the exhaust pipe 3 is completely straight in the regions surrounded by the heat accumulator 5, that is, has a straight longitudinal central axis.

FIG. 2 shows a schematic sectional illustration through a region of the exhaust system 2, wherein the exhaust pipe 3 and the heat accumulator 5 can be seen. Furthermore, it is made clear that, in the radial direction with respect to the longitudinal central axis 6 of the exhaust pipe 3, a cross-section adjusting element 7 is arranged between the exhaust pipe 3 and the heat accumulator 5 and serves for adjusting a specific passage cross section between the exhaust pipe 3 and the heat accumulator 5, in particular between an outer circumference 8 of the exhaust pipe 3 and an inner circumference 9 of the heat accumulator 5.

The cross-section adjusting element 7 has a first holed pipe 10 and a second holed pipe 11. Each of the holed pipes 10 and 11 is equipped with a plurality of passage openings 12 or 13, only some of which are indicated here. The two holed pipes 10 and 11 can be shifted in position relative to each other for adjusting the desired passage cross section, in particular in the axial direction and/or in the peripheral direction with respect to the longitudinal central axis 6. For example, the first holed pipe 10 is hereby arranged in a stationary position with respect to the exhaust pipe 3, whereas the second holed pipe 11 can be shifted in position with respect to the first holed pipe 10, and consequently also with respect to the exhaust pipe 3. A reversed embodiment can obviously also be realized.

Arranged in the heat accumulator 5 is at least one heat exchanger line 14, a connection port 15 of which is illustrated. A fluid can be conveyed through the heat exchanger line 14 in order to remove heat from the heat accumulator 15. Connected in terms of fluid mechanics at the heat exchanger line 14 is, for example, a fluid conveyance device, which is not illustrated here and serves for conveying the fluid through the heat exchanger line 14.

FIG. 3 shows a schematic cross-sectional illustration through a region of the exhaust system 2. It is made clear that the heat exchanger line 14 passes several times through the heat accumulator 5 or that, in the heat accumulator 5, a plurality of such heat exchanger lines 14 are arranged. In addition, it can be seen that the heat accumulator 5 is round in cross section and also surrounds the exhaust pipe 3 in a circular manner.

It can be provided that a fluid chamber 16, which is present in the radial direction between the exhaust pipe 3 and the heat accumulator 5, can be evacuated or is permanently evacuated. For this purpose, in the first case, the fluid chamber 16 is preferably connected to a source of reduced pressure, namely, in particular, by way of a control valve. Through the evacuation of the fluid chamber 16, the heat accumulator 5 is thermally decoupled from the exhaust pipe 3 in regard to heat that is transferred by convection, so that an especially good insulation is achieved or, when the passage cross section is freed, the heat transfer occurs mostly or exclusively through thermal radiation. Serving as a source of reduced pressure is, for example, the drive assembly, in particular the drive assembly designed as an internal combustion engine. Alternatively, as a source of reduced pressure, a vacuum pump can be provided. The heat exchanger line 14 serves, for example, for cooling the heat accumulator 5 in the case that the heat input into the heat accumulator 5 from the exhaust that flows through the exhaust pipe 3 is too high.

The invention claimed is:

1. An exhaust system for a motor vehicle, comprising:
an exhaust pipe for discharging exhaust of a device that produces an exhaust, wherein that a heat accumulator, which surrounds the exhaust pipe in the peripheral direction with respect to a longitudinal central axis of the exhaust pipe at least in regions thereof, is present and, in the radial direction between the exhaust pipe and the heat accumulator over at least one portion of the longitudinal extension of the heat accumulator, a cross-section adjusting element for adjusting a passage cross section is arranged between the exhaust pipe and the heat accumulator, wherein the cross-section adjusting element has a first holed pipe, which surrounds the exhaust pipe, and a second holed pipe, which surrounds the first holed pipe, wherein the first holed pipe and the second holed pipe can be shifted in position relative to each other for adjusting the passage cross section.

2. The exhaust system according to claim 1, wherein a heat exchanger line is arranged in the heat accumulator.

3. The exhaust system according to claim 2, wherein a heat storage medium is present in the heat accumulator.

4. The exhaust system according to claim 3, wherein the heat storage medium is a latent heat storage medium.

5. The exhaust system according to claim 3, wherein the heat exchanger line passes through the heat storage medium.

6. The exhaust system according to claim 1, wherein the heat accumulator has a hollow circular-cylindrical heat storage housing.

7. The exhaust system according to claim 1, wherein a fluid chamber, which is present in the radial direction between the exhaust pipe and the heat accumulator, can be evacuated or is evacuated.

8. The exhaust system according to claim 7, wherein the fluid chamber is connected in terms of in fluid mechanics by way of a control valve to a source of reduced pressure.

9. A motor vehicle with an energy storage unit for intervening storage of electrical energy and with an exhaust system, in particular an exhaust system, wherein the exhaust system is equipped with an exhaust pipe for discharging exhaust of a device that produces an exhaust, wherein a heat accumulator, which surrounds the exhaust pipe in the peripheral direction with respect to a longitudinal central axis of the exhaust pipe at least in regions thereof, is present and, in the radial direction between the exhaust pipe and the heat accumulator over at least a portion of the longitudinal extension the heat accumulator, a cross-section adjusting element for adjusting a passage cross section is arranged between the exhaust pipe and the heat accumulator, wherein the cross-section adjusting element has a first holed pipe, which surrounds the exhaust pipe, and a second holed pipe, which surrounds the first holed pipe, wherein the first holed pipe and the second holed pipe can be shifted in position relative to each other for adjusting the passage cross section.

10. The motor vehicle according to claim 9, wherein the heat accumulator surrounds a region of the exhaust pipe that overlaps the energy storage unit.

* * * * *